(12) United States Patent
Ferguson

(10) Patent No.: US 9,445,575 B2
(45) Date of Patent: Sep. 20, 2016

(54) ABSORBENT PAD CONFIGURED FOR RECEIVING WASTE

(71) Applicant: PET FOOD EXPRESS, Oakland, CA (US)

(72) Inventor: Jason E. Ferguson, Richmond, CA (US)

(73) Assignee: Pet Food Express, Oakland, CA (US)

( * ) Notice: Subject to any disclaimer, the term of this patent is extended or adjusted under 35 U.S.C. 154(b) by 0 days.

(21) Appl. No.: 13/933,440

(22) Filed: Jul. 2, 2013

(65) Prior Publication Data

US 2014/0138966 A1 May 22, 2014

Related U.S. Application Data

(60) Provisional application No. 61/728,850, filed on Nov. 21, 2012.

(51) Int. Cl.
*A01K 23/00* (2006.01)
*A01K 1/01* (2006.01)

(52) U.S. Cl.
CPC .................................. *A01K 1/0107* (2013.01)

(58) Field of Classification Search
CPC ................................................... A01K 1/0107
USPC ............ 294/1.3–1.5, 152; 119/161; 141/337; 383/4, 72, 117
See application file for complete search history.

(56) References Cited

U.S. PATENT DOCUMENTS

| | | | | |
|---|---|---|---|---|
| 3,551,876 A | * | 12/1970 | Walter | 439/110 |
| 3,626,900 A | * | 12/1971 | Failla | 119/161 |
| 3,862,873 A | * | 1/1975 | Blose | 156/500 |
| 4,337,812 A | * | 7/1982 | Trinkner | 383/4 |
| 4,580,372 A | * | 4/1986 | Osborn | 52/3 |
| 4,723,327 A | * | 2/1988 | Smith | 5/89.1 |
| 4,738,477 A | * | 4/1988 | Grossmeyer | A01G 1/12 15/257.1 |
| 4,763,603 A | | 8/1988 | Coes | |
| 4,794,029 A | * | 12/1988 | Tennant et al. | 383/4 |
| 4,799,520 A | * | 1/1989 | Blackburn et al. | 206/423 |
| 4,800,677 A | * | 1/1989 | Mack | 119/171 |
| D299,979 S | * | 2/1989 | Garrison | D34/1 |
| 4,932,360 A | | 6/1990 | O'Connor | |
| 4,938,607 A | * | 7/1990 | Kelley | 383/4 |
| 5,092,681 A | * | 3/1992 | Ashley, III | 383/4 |
| 5,129,364 A | | 7/1992 | Pirkle | |
| 5,178,426 A | * | 1/1993 | David | A01K 23/005 119/161 |
| 5,289,670 A | * | 3/1994 | Morgan | B65D 75/14 229/87.01 |
| 5,476,067 A | | 12/1995 | Queen et al. | |
| 5,482,007 A | | 1/1996 | Kumlin | |
| 5,758,601 A | | 6/1998 | Dickson | |
| D410,574 S | * | 6/1999 | McCaig | D34/1 |
| 5,943,831 A | * | 8/1999 | Pangburn | 52/155 |

(Continued)

*Primary Examiner* — Paul T Chin
(74) *Attorney, Agent, or Firm* — Quinn Law Group, PLLC

(57) ABSTRACT

An absorbent pad is configured for receiving waste. The absorbent pad includes a base layer and a string. The base layer has a collection region surrounded by a peripheral edge. The string is slidably attached to the peripheral edge at a plurality of locations. The base layer is configured to move from an open position to a closed position. The base layer is configured to be substantially flat such that the string is disposed along the peripheral edge when the base layer is in the open position. The base layer moves from the open position to the closed position in response to sliding the string relative to the plurality of locations, whereby the peripheral edge is drawn together at the plurality of locations to form a bundle and the string is only disposed along the peripheral edge corresponding to the plurality of locations.

14 Claims, 4 Drawing Sheets

(56) References Cited

U.S. PATENT DOCUMENTS

| | | | |
|---|---|---|---|
| 7,594,754 B2 * | 9/2009 | Costello | B65F 1/00 383/117 |
| D611,670 S * | 3/2010 | Booth | D34/1 |
| 7,785,008 B2 * | 8/2010 | Schoenig et al. | 383/4 |
| 7,967,508 B2 * | 6/2011 | Costello | 383/4 |
| 8,007,615 B2 * | 8/2011 | Sadlier | 156/211 |
| 8,336,499 B2 * | 12/2012 | Kunz Astete | A01K 61/007 119/223 |
| 2009/0114161 A1 | 5/2009 | Carnahan et al. | |

* cited by examiner

ABSORBENT PAD CONFIGURED FOR RECEIVING WASTE

CROSS-REFERENCE TO RELATED APPLICATIONS

This application claims the benefit of U.S. Provisional Patent Application No. 61/728,850 filed on Nov. 21, 2012, which is hereby incorporated by reference in its entirety.

TECHNICAL FIELD

This disclosure relates to an absorbent pad configured for absorbing waste.

BACKGROUND

Many people enjoy pets. Unfortunately, pets frequently need to urinate and defecate, which creates a mess that someone must clean up. Pets are often trained to perform their bodily functions on a given surface, such as a newspaper. Unfortunately, someone must still dispose of the soiled newspaper or other surface. This can be difficult, as many surfaces disintegrate when they get wet. Moreover, if the newspaper or other surface is not lifted correctly, urine or feces can fall out and onto the floor. The corners or edges of these surfaces are often covered in urine or feces, making it unavoidable that the individual charged with disposing of the mess must come into contact with a soiled portion of the surface.

SUMMARY

In one aspect of the disclosure, an absorbent pad is configured for receiving waste. The absorbent pad includes a base layer and a string. The base layer includes a collection region surrounded by a peripheral edge. The string is slidably attached to the peripheral edge of the base layer at a plurality of locations. The base layer is configured to move from an open position to a closed position. The base layer is configured to be substantially flat such that the string is disposed along the peripheral edge when the base layer is in the open position. The base layer is configured to move from the open position to the closed position in response to sliding the string relative to the plurality of locations, whereby the peripheral edge is drawn together at the first and second location to form a bundle such that the string is only disposed along the peripheral edge corresponding to each of the plurality of locations.

In another aspect of the disclosure, the absorbent pad includes a base layer and a string. The base layer includes a collection region surrounded by a peripheral edge. The peripheral edge defines a channel at each of plurality of locations. The string slidably extends through each of the channels. The base layer is configured to move from an open position to a closed position. The base layer is configured to be substantially flat such that the string is disposed along the peripheral edge when the base layer is in the open position. The base layer is configured to move from the open position to the closed position in response to sliding the string through the channels, whereby the peripheral edge is drawn together at each of the plurality of locations to form a bundle such that the string is only disposed along the peripheral edge corresponding to each of the plurality of locations.

In yet another aspect of the disclosure, the absorbent pad includes a base layer, a ring layer, and a string. The base layer includes a collection region surrounded by a peripheral edge. The peripheral edge defines a channel at each of a first, second, third, and fourth location. The ring layer corresponds to a shape of the peripheral edge. The string slidably extends through each of the channels. The base layer is configured to move from an open position to a closed position. The base layer is configured to be substantially flat such that the string is disposed along the peripheral edge between the ring layer and the base layer when the base layer is in the open position. The base layer is configured to move from the open position to the closed position in response to sliding the string through the channels, whereby the peripheral edge is drawn together at the first, second, third, and fourth location to form a bundle such that the string is only disposed along the peripheral edge between the ring layer and the base layer corresponding to the first, second, third, and fourth location.

The absorbent pad has a peripheral edge with a string slidably attached to the absorbent pad at a plurality of locations along the peripheral edge. The absorbent pad is configured to provide a location for a pet to deposit their waste. Once the pet has deposited their waste, the absorbent pad may be picked up by grasping the string at one of the locations such that the locations are drawn together to form a bundle that retains the waste therein.

The above features and advantages, and other features and advantages, of the present invention are readily apparent from the following detailed description of some of the best modes and other embodiments for carrying out the invention, as defined in the appended claims, when taken in connection with the accompanying drawings.

DESCRIPTION OF THE ENABLING EMBODIMENT

Figure 1:
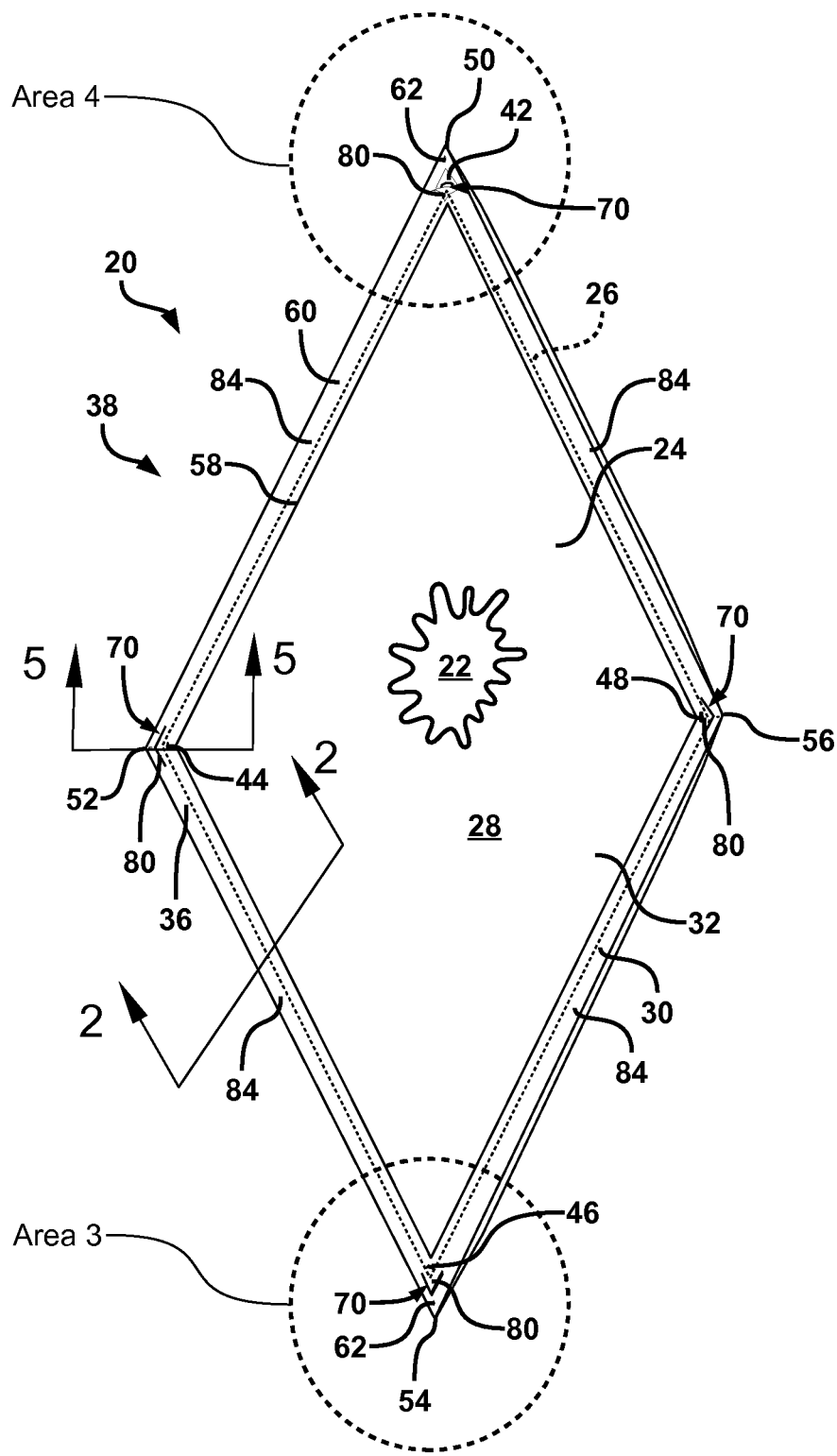
FIG. 1 is a schematic top perspective view of an absorbent pad in an open position.

Referring to the Figures, wherein like numerals indicate like parts throughout the several views, an absorbent pad 20, configured for receiving waste 22, is shown at in FIG. 1. The absorbent pad 20 includes a base layer 24 and a string 26. The base layer 24 includes a collection region 28 and a peripheral edge 30 surrounding the collection region 28. The absorbent pad 20 is configured to be laid upon a surface, such as a floor, to provide a location for a pet deposit their waste 22. More specifically, the collection region 28 is configured such that waste 22 is deposited thereon. As will be described in more detail below, a user may be able to pick up the soiled absorbent pad 20 using a little as one finger.

The base layer 24 includes a first layer 32, a second layer 34, and a ring layer 36. The first layer 32 may be formed from an absorbent material. The absorbent material may include cloth, cellulose, gel, and the like. The cloth may include cotton, muslin, terry toweling, polymers, and the like. The gel may be a silica gel and the like. The absorbent material is configured for absorbing urine and other undesirable substances. The absorbent pad 20 allows waste 22, such as urine, feces, vomit, and the like, to be picked up and disposed of by a human, without the human having to contact the waste 22.

The second layer 34 may be formed from a fluid impermeable material. More specifically, the second layer 34 may be formed from polyethylene, polymers, a cloth-like film, and the like, that prevents any liquids from leaking out of the absorbent pad 20. The first layer 32 may be secured to the second layer 34 with adhesive, heat sealing, fasteners, and the like.

Figure 7:
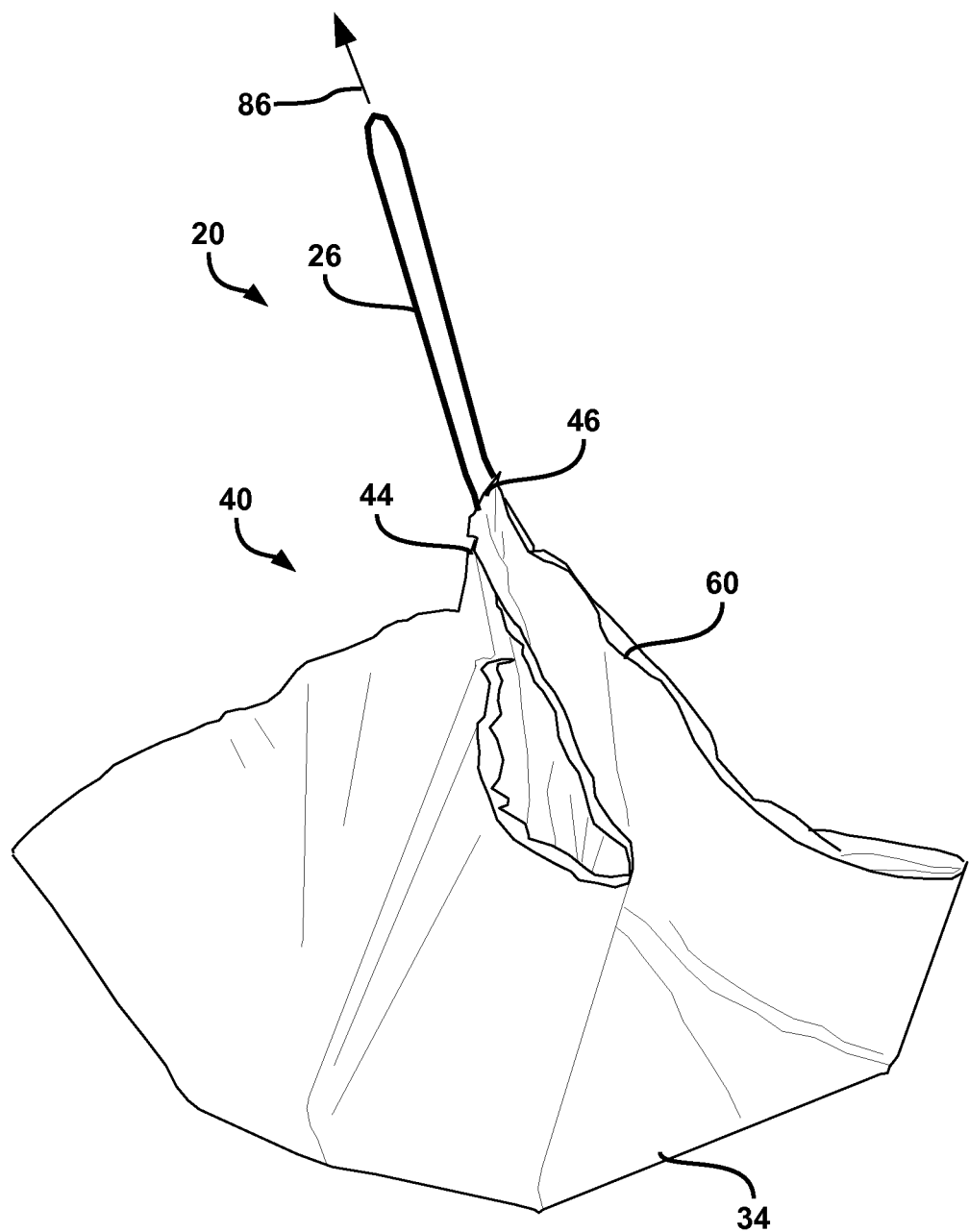
FIG. 7 is a schematic top perspective view of the absorbent pad in a closed position.

The base layer 24 is configured for moving between an open position 38, as illustrated in FIG. 1, and a closed position 40, as illustrated in FIG. 7. Referring now to FIG. 1, the base layer 24 is substantially flat when in the open position 38. Likewise, referring to FIG. 7, the base layer 24 forms a bundle such that the peripheral edge 30 is drawn together when the base layer 24 is in the closed position 40. Therefore, when the absorbent pad 20 is in the closed position 40, the waste 22 is contained by the confines of the bundled base layer 24 such that the absorbent pad 20 forms a receptacle for holding fluid and solid waste 22 in response to the user grasping and pulling the string 26.

Figure 2:
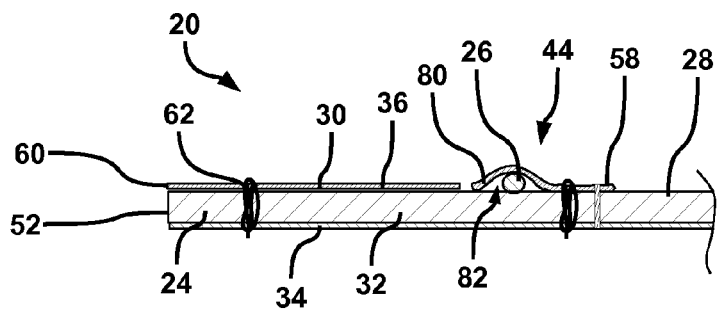
FIG. 2 is a schematic cross-sectional side view of the absorbent pad of FIG. 1, taken along line 2-2.
Figure 5:
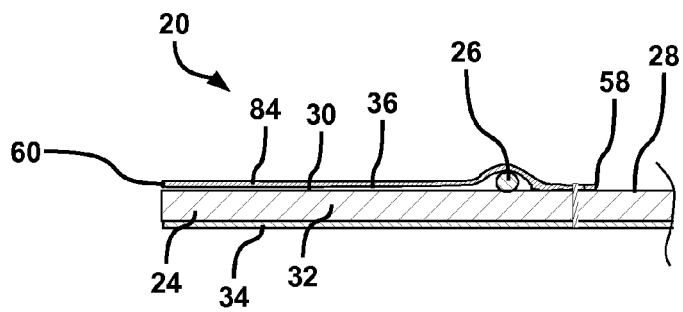
FIG. 5 is a schematic cross-sectional side view of the absorbent pad of FIG. 1, taken along line 5-5.
Figure 6:
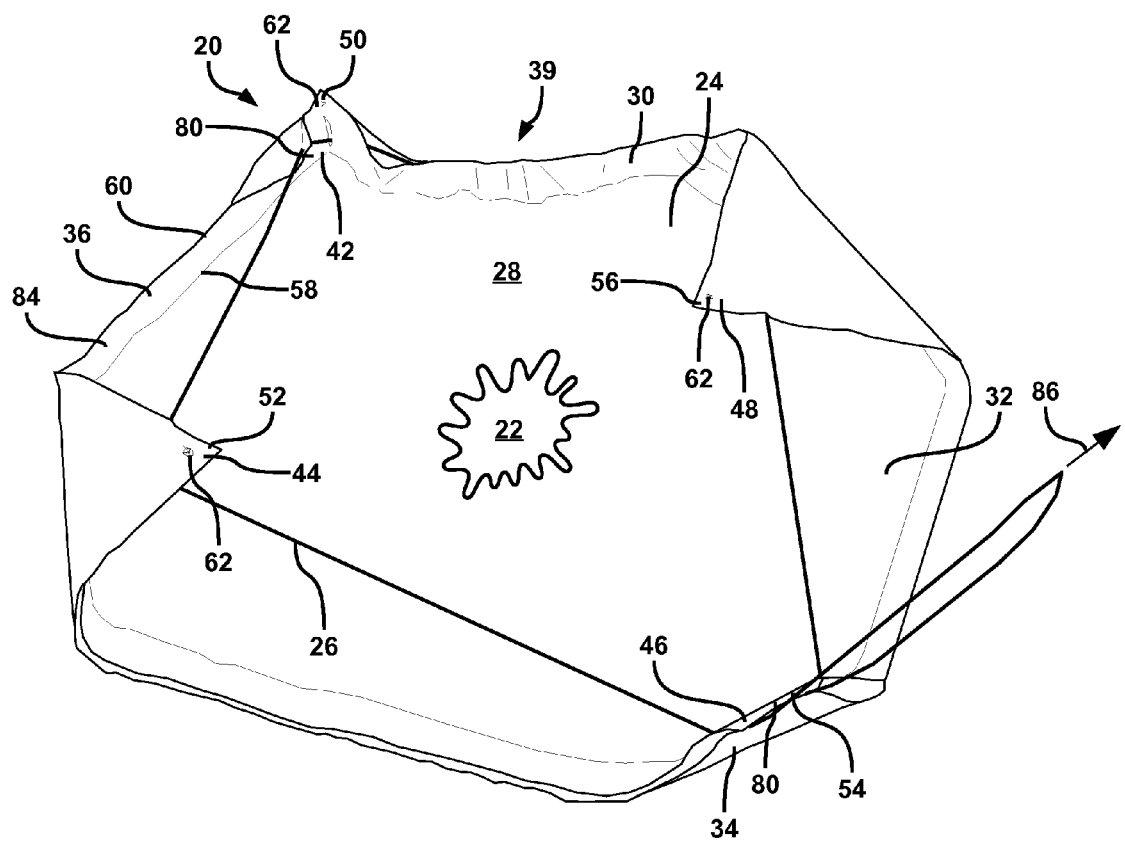
FIG. 6 is a schematic top perspective view of the absorbent pad of FIG. 1, with the absorbent pad in a partially closed position.

The string 26 may be formed from cotton, polyester, nylon, and the like. The string 26 may be formed to have a thin and flat cross-section, a round cross-section, and the like. Referring to FIGS. 1, 2, and 6, the string 26 is slidably attached to the peripheral edge 30 of the base layer 24 at a first location 42, a second location 44, a third location 46, and a fourth location 48. The string 26 may be formed as a continuous loop. As such, while the string 26 is slidably attached to the base layer 24 at each of the first, second, third, and fourth locations 42, 44, 46, 48, the string 26 is not removable from the base layer 24. Referring to FIGS. 1 and 5, the string 26 is disposed along the entire peripheral edge 30 when the base layer 24 is in the open position 38. However, as described in more detail below, with reference to FIGS. 6 and 7, the string 26 is only disposed along the peripheral edge 30 at the respective locations 42, 44, 46, 48 when the base layer 24 is in the closed position 40.

Referring again to FIG. 1, the base layer 24 may have a rectangular shape having a first corner 50, a second corner 52, a third corner 54, and a fourth corner 56. The first location 42 is at the first corner 50, the second location 44 is at the second corner 52, the third location 46 is at the third corner 54, and the fourth location 48 is at the fourth corner 56. It should be appreciated that the locations 42, 44, 46, 48 may also be disposed at other locations 42, 44, 46, 48 that surround the peripheral edge 30 of the base layer 24. It should also be appreciated that the base layer 24 may be any other shape.

The absorbent pad 20 may also include the ring layer 36 that corresponds to a shape of the peripheral edge 30. Therefore, if the base layer 24 is rectangular in shape, then the ring layer 36 would also be rectangular in shape, so as to match the rectangular shape of the corresponding peripheral edge 30. As such, the ring layer 36 surrounds the periphery of the collection region 28.

The ring layer 36 may be formed from a fluid impermeable material, such as polyethylene, a cloth-like film, and the like. The ring layer 36 is configured to prevent any liquids from leaking therethrough. The ring layer 36 is configured such that the string 26 is disposed between the ring layer 36 and the first layer 32 when the base layer 24 is in the open position 38, as illustrated in FIG. 1. Therefore, the ring layer 36 protects the string 26 from being soiled when the absorbent pad 20 is in the open position 38. The ring layer 36 may prevent the pet from becoming entangled in the string 26 as the pet traverses ring layer 36 and the corresponding portion of the string 26.

The ring layer 36 presents an inner edge 58 surrounding the collection area and an outer edge 60 that surrounds the inner edge 58. The ring layer 36 is operatively attached to the base layer 24 at the inner edge 58 and not attached to the base layer 24 at the outer edge 60. As such, an apron 84 is formed between the ring layer 36 and the base layer 24 and the string 26 is operatively disposed under the apron 84 when the absorbent pad 20 is in the open position 38, as shown in FIG. 1. Since the string 26 is slidably attached to the base layer 24 only at each of the first, second, third, and fourth locations 42, 44, 46, 48, when the string 26 is pulled relative to the base layer 24 at one of the locations 42, 44, 46, 48 (as indicated by the arrow 86 in FIGS. 6 and 7), the string 26 slides relative to each of the locations 42, 44, 46, 48, while exiting from beneath the apron 84 between each of the adjacent locations 42, 44, 46, 48. This allows the four corners 50, 52, 54, 56 to be drawn together, while the absorbent pad 20 moves from the open position 38 (as illustrated in FIG. 1), through a partially closed position 39 (as illustrated in FIG. 6), and into the closed position 40 (as illustrated in FIG. 7).

The absorbent pad 20 may also include a restraint 62 at each of the first, second, third, and fourth corner 50, 52, 54, 56. As such, a channel 82 is defined between each of the restraints 62 and the inner edge 58 at each location 42, 44, 46, 48. The string 26 is slidably disposed in the channel 82 defined between the inner edge 58 of the ring layer 36 and each respective restraint 62 such that the string 26 is slidably retained to the base layer 24 at each location 42, 44, 46, 48. Therefore, since the string 26 is formed as a continuous loop, the restraints 62 keep the string 26 retained to the absorbent pad 20, while allowing the string 26 to be pulled, relative to the base layer 24, at any of the locations 42, 44, 46, 48.

Figure 3:
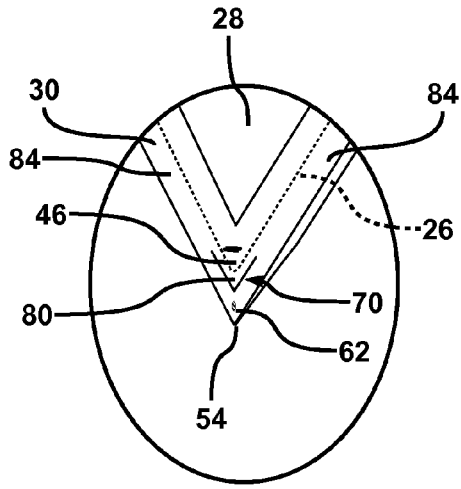
FIG. 3 is an enlargement of the area "Area 3," as provided in FIG. 1
Figure 4:
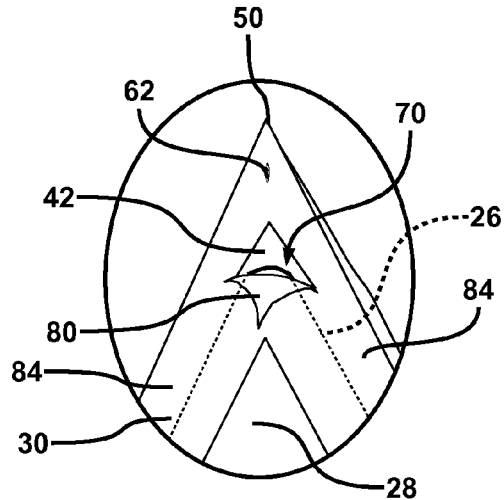
FIG. 4 is an enlargement of the area "Area 4," as provided in FIG. 1

The ring layer 36 may also define at least one opening 70 between the inner edge 58 and the outer edge 60. More specifically, referring to FIGS. 1, 3, and 4, the ring layer 36 defines an opening at each of the first, second, third, and fourth corners 50, 52, 54, 56. The openings 70 provide access to grasp the string 26. Further, the openings 70 may each be configured such that the ring layer 36 provides a flap 80 that is configured to cover the string 26 until the user is ready to pick up and disposed of the absorbent pad 20. Therefore, the flaps 80 of the ring layer 36 provide protection such that the string 26 does not become soiled at each of the locations 42, 44, 46, 48. Since there is a flap 80 at each of the locations 42, 44, 46, 48, the user may be able to lift up the tab that is the least soiled in order to access the corresponding portion of the string 26 beneath the tab. The user may grasp the string 26 beneath the tab and pull the string 26, relative to the base layer 24, as illustrated in FIGS. 1, 4, 6, and 7, until the absorbent pad 20 is bundled into the closed position 40. Once the absorbent pad 20 is in the closed position 40, the absorbent pad 20 may be disposed of in a waste 22 receptacle.

While the best modes for carrying out the disclosure have been described in detail, those familiar with the art to which this disclosure relates will recognize various alternative designs and embodiments for practicing the disclosure within the scope of the appended claims.

The invention claimed is:

1. An absorbent pad configured for receiving waste, the absorbent pad comprising:
   a base layer including a collection region surrounded by a peripheral edge having a rectangular shape, such that a first corner, a second corner, a third corner, and a fourth corner are disposed in spaced relationship to one another along the peripheral edge; and
   a string slidably attached to the base layer at only the first corner, the second corner, third corner, and the fourth corner;
   wherein the base layer is configured to move from an open position to a closed position;
   wherein the base layer is configured to be substantially flat when the base layer is in the open position such that the string is configured to be disposed along the entire peripheral edge when the base layer is in the open position; and
   wherein the base layer is configured to move from the open position to the closed position in response to sliding the string relative to the base layer at each of the first corner, the second corner, the third corner, and the fourth corner, such that, in the closed position, the peripheral edge is drawn together at each of the first corner, the second corner, the third corner, and the fourth corner, to form a bundle and the string is not disposed along the peripheral edge extending between each of the first corner, the second corner, the third corner, and the fourth corner.

2. An absorbent pad, as set forth in claim 1, wherein the string is formed as a loop.

3. An absorbent pad, as set forth in claim 1, wherein the base layer includes a first layer and a ring layer corresponding to a shape of the peripheral edge;
   wherein the ring layer is configured such that the string is disposed between the ring layer and the first layer when the base layer is in the open position; and
   wherein the ring layer is configured such that portions of the string that are not slidably attached to the peripheral edge at the first, second, third, and fourth location are not disposed between the ring layer and the first layer when the base layer is in the closed position.

4. An absorbent pad, as set forth in claim 3, wherein the ring layer presents an inner edge surrounding the collection area and an outer edge surrounding the inner edge;
   wherein the ring layer is operatively attached to the base layer at the inner edge such that portions of the string that are not slidably attached to the peripheral edge at the first, second, third, and fourth location are not disposed between the ring layer and the first layer when the base layer is in the closed position.

5. An absorbent pad, as set forth in claim 4, further comprising a restraint at each of the first, second, third, and fourth corner;
   wherein the string is slidably disposed between each of the restraints and the inner edge of the ring layer such that portions of the string that are not slidably disposed between each of the restraints and the inner edge are also not disposed between the ring layer and the first layer when the base layer is in the closed position.

6. An absorbent pad, as set forth in claim 5, wherein the ring layer defines at least one opening between the inner edge and the outer edge to provide access to grasp the string.

7. An absorbent pad, as set forth in claim 6, wherein the ring layer defines an opening at each of the first, second, third, and fourth corners.

8. An absorbent pad, as set forth in claim 3 wherein the first layer is formed from an absorbent material.

9. An absorbent pad, as set forth in claim 8, wherein the base layer includes a second layer formed from a fluid impermeable material such that the first layer is disposed between the ring layer and the second layer.

10. An absorbent pad, as set forth in claim 1, wherein the base layer includes:
    a first layer formed from an absorbent material; and
    a second layer formed from a fluid impermeable material configured to prevent liquid from leaking through the absorbent pad.

11. An absorbent pad configured for receiving waste, the absorbent pad comprising:
    a base layer including a collection region surrounded by a peripheral edge having a rectangular shape, such that a first corner, a second corner, a third corner, and a fourth corner are disposed in spaced relationship to one another along the peripheral edge;
    wherein each of the first corner, the second corner, the third corner, and the fourth corner defines a channel; and
    a string slidably extending through each of the channels such that the string is slidably attached to the base layer only at each of the first corner, the second corner, the third corner, and the fourth corner;
    wherein the base layer is configured to move from an open position to a closed position;
    wherein the base layer is configured to be substantially flat when the base layer is in the open position such that the string is configured to be disposed along the entire peripheral edge when the base layer is in the open position; and
    wherein the base layer is configured to move from the open position to the closed position in response to sliding the string through the channels, relative to the base layer, such that the peripheral edge is drawn together at each of the first corner, the second corner, the third corner, and the fourth corner to form a bundle such that the string is not disposed along the peripheral edge extending between each of the first corner, the second corner, the third corner, and the fourth corner.

12. An absorbent pad, as set forth in claim 11, further comprising a flap covering each channel.

13. An absorbent pad, as set forth in claim 11, wherein the string is formed as a loop.

14. An absorbent pad, as set forth in claim 11, wherein the base layer includes:
    a first layer formed from an absorbent material; and
    a second layer formed from a fluid impermeable material configured to prevent liquid from leaking through the absorbent pad.

* * * * *